United States Patent
Springer

(10) Patent No.: US 9,185,214 B2
(45) Date of Patent: Nov. 10, 2015

(54) METHOD AND APPARATUS FOR PROVIDING ENHANCED COMMUNICATIONS

(71) Applicant: Nuance Communications, Inc., Burlington, MA (US)

(72) Inventor: Stephen R. Springer, Needham, MA (US)

(73) Assignee: Nuance Communications, Inc., Burlington, MA (US)

( * ) Notice: Subject to any disclaimer, the term of this patent is extended or adjusted under 35 U.S.C. 154(b) by 191 days.

(21) Appl. No.: 13/780,704

(22) Filed: Feb. 28, 2013

(65) Prior Publication Data

US 2014/0241513 A1    Aug. 28, 2014

(51) Int. Cl.
*H04M 1/64* (2006.01)
*H04M 3/493* (2006.01)
*H04M 3/51* (2006.01)
*G06F 7/04* (2006.01)

(52) U.S. Cl.
CPC ............ *H04M 3/493* (2013.01); *H04M 3/5166* (2013.01); *H04M 3/5191* (2013.01); *H04M 2203/6081* (2013.01)

(58) Field of Classification Search
CPC ............... H04M 2203/105; H04M 2203/1058; H04M 3/42059; H04M 3/42102; H04M 3/493; H04N 21/25891; H04N 21/4532; H04N 21/47211; H04N 21/4751; H04N 21/4753; H04N 21/6187; H04N 7/165; H04N 7/17309
USPC .................. 379/67.01, 88.01–88.19, 142.04, 379/142.05; 726/5
See application file for complete search history.

(56) References Cited

U.S. PATENT DOCUMENTS

| | | | |
|---|---|---|---|
| 7,353,016 B2 | 4/2008 | Roundtree et al. | |
| 7,502,453 B1* | 3/2009 | Hasmanis et al. | ........ 379/102.03 |
| 7,539,484 B2 | 5/2009 | Roundtree et al. | |
| 7,676,221 B2 | 3/2010 | Roundtree et al. | |
| 2001/0056541 A1* | 12/2001 | Matsuzaki et al. | ............ 713/193 |
| 2005/0251445 A1* | 11/2005 | Wong et al. | ..................... 705/14 |
| 2007/0165799 A1* | 7/2007 | Juncker | ...................... 379/88.21 |
| 2008/0141353 A1* | 6/2008 | Brown | .............................. 726/7 |
| 2008/0311878 A1* | 12/2008 | Martin et al. | ............... 455/404.1 |
| 2010/0150348 A1* | 6/2010 | Fairbanks et al. | ............. 380/255 |
| 2011/0034252 A1* | 2/2011 | Morrison et al. | ............... 463/42 |

OTHER PUBLICATIONS http://en.wikipedia.org; Wikipedia, "Automatic Number Identification", retrieved from Internet Jan. 26, 2012.

* cited by examiner

*Primary Examiner* — Solomon Bezuayehu
(74) *Attorney, Agent, or Firm* — Hamilton, Brook, Smith & Reynolds, P.C.

(57) ABSTRACT

Call service centers typically require a user to confirm its identity by manually entering identification. An embodiment of the present invention uses a client device's identification to identify a user securely without requiring a user to enter identification manually. The client device's automatic numbering identification (ANI) number is an example of identification of the user, and the client device's media access control address is an example of information used, as an encryption key, to verify that the ANI number is not spoofed. In one embodiment, the client device provides the ANI number to a data server prior to a call, and the data server provides information to enable enhancement of the call either by sending the information to the call center directly or via the client device. Benefits of embodiments of the present invention include a reduced load on call service centers, reduced call time, and increased user satisfaction.

11 Claims, 14 Drawing Sheets

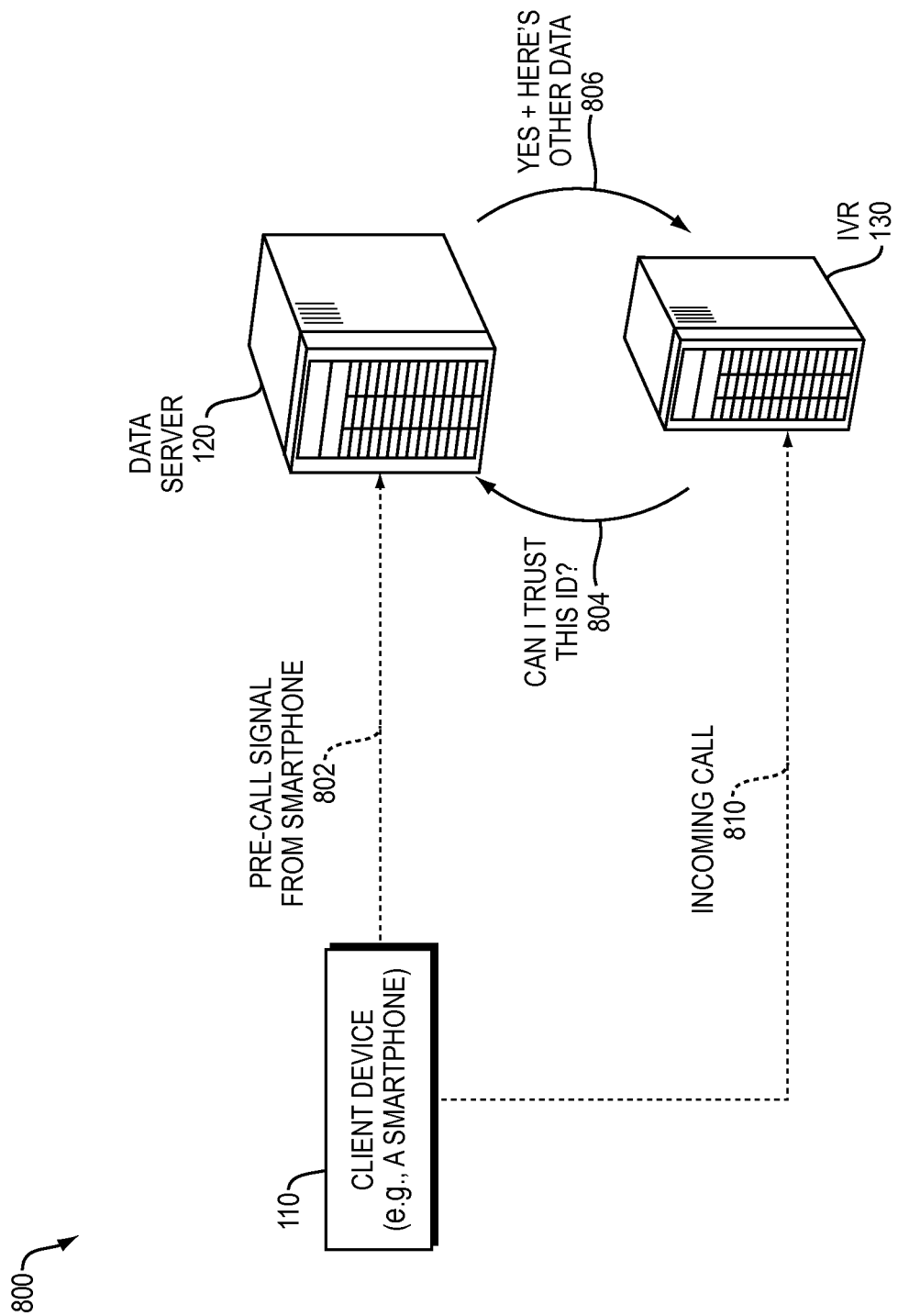

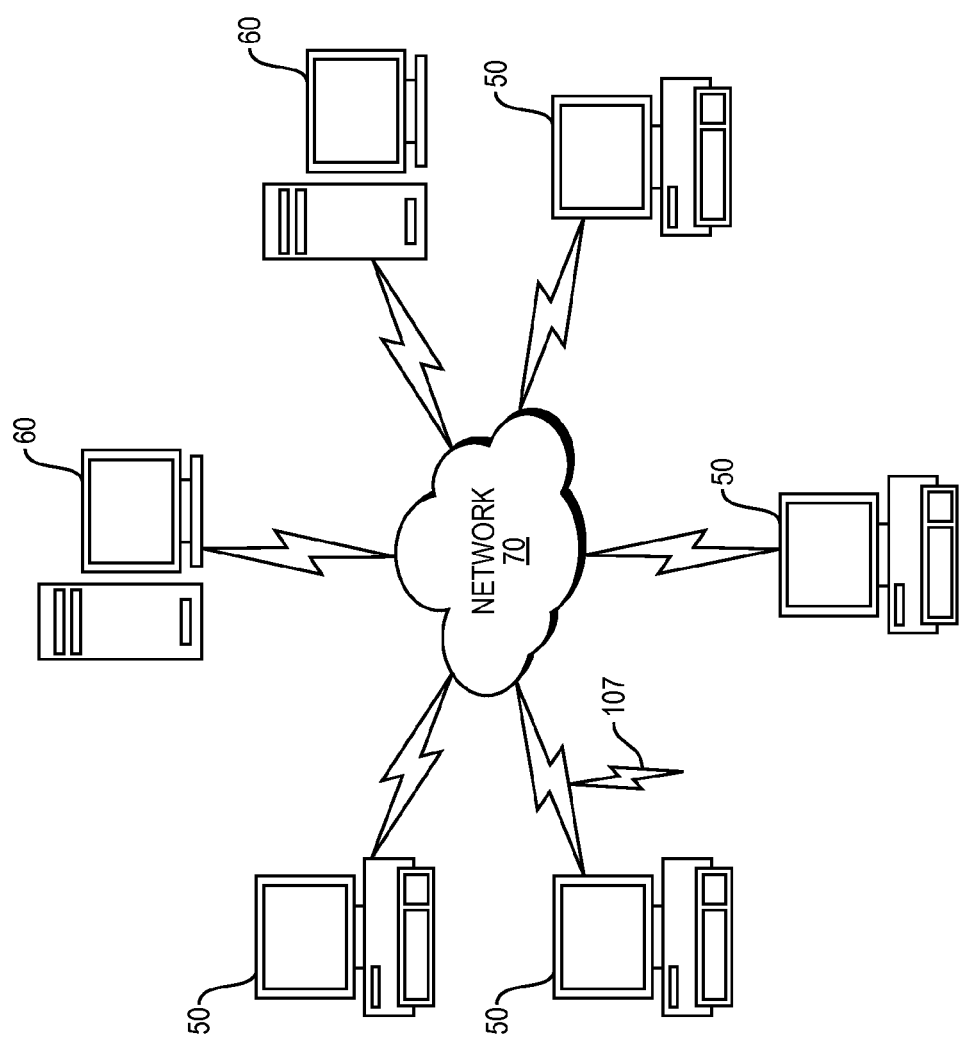

METHOD AND APPARATUS FOR PROVIDING ENHANCED COMMUNICATIONS

BACKGROUND OF THE INVENTION

Telephone and cellular networks support transmission of audio (e.g., voice) over a voice-band channel and data over a data channel. Some telephone and cellular networks support connecting with a client device via a voice-band channel and data channel simultaneously. Other telephone and cellular networks do not support a simultaneous connection and only support connecting with a client device via either a voice-band channel or a data channel, but not both at the same time. Other telephone and cellular networks communicate small amounts of data over a voice-band channel through dual-tone multi-frequency (DTMF) signaling.

SUMMARY OF THE INVENTION

In one embodiment, a method for providing enhanced communications includes, by a client device, providing information associated with the client device to a data server via a data channel. The method further includes, by the client device, providing enhanced communications with an automated Interactive Voice Response server and/or human customer service agents via an audio channel, where the enhancements are enabled by using the information provided by the client device to the data server.

In one embodiment, the method includes storing information to identify client devices and their users on the data server, such as by dynamically allocating memory, in the data server to store information associated with the client device, and optionally information relating to providing enhanced communications associated with the client device. The method may include forwarding authentication information, by the client device to the data server, wherein the forwarded authentication information is available to authenticate a communications request. The authentication information may be based on an encrypted passcode, an identification string guaranteed unique to the client device such as its Media Access Control (MAC) address, or other identifiers associated with the client device. The identifiers may include Automatic Number Identification (ANI) information and a telephone number associated with the client device. Providing enhanced communications may include, for example, providing access to data with an interactive voice response (IVR) system that would normally be unavailable or would be available but require a user to navigate through the IVR system through a much more lengthy process. Other forms of enhanced communications are also contemplated by embodiments of the present invention, such as increased telephony channel bandwidth compared to normally-associated bandwidth for the client device or being given higher priority for the user of the client device to be passed through to a Customer Service Representative (CSRs) as compared to other client devices. Yet other example embodiments include enabling a user of the client device to return to a previously accessed state within an IVR system, enabling a user to bypass audio (or video) advertisements, forwarding information provided by the client device over the data channel directly to a CSR to reduce the information that the CSR collects from the user of the device, or enabling a user to access a human via the IVR system at user-selectable times.

The method may further include establishing communications, by the client device, to the Interactive Voice Response server over a bandwidth-limited communications channel. The bandwidth limited communications channel may be a telephony channel.

The information provided by the client device may include global positioning information associated with the client device, or any similar information stored on or computed by the client device.

In another embodiment, a method for providing enhanced communications includes obtaining information associated with the client device and the communications request by a data server, in response to a communications request initiated by a client device. The method may further include forwarding the information associated with the client device and the communications request to an Interactive Voice Response server to provide enhanced communications between the client device and the Interactive Voice Response server. The method may further include obtaining the information associated with the client device by accessing a database having information describing the client device therein by the data server.

In another embodiment, a method for providing enhanced communications includes (i) obtaining information associated with a communications request initiated by a client device and information associated with the client device from a data server by an interactive response server and (ii) establishing enhanced communications with the client device using the information obtained from the data server.

In one embodiment, a system for providing enhanced communications comprises a client device that includes client-side handshake module. The client-side handshake module is configured to provide identifying information associated with the client device to a data server via a data channel. The client device's client-side handshake module is also configured to receive authenticating information from the data server via the data channel. The client-side handshake module is further configured to provide enhanced communications with a interactive response server using the authenticating information provided by data server to the client device.

In one embodiment, an apparatus for providing enhanced communications includes a "server-side handshake" module coupled with a database. The server-side handshake module is configured to obtain identifying information associated with a client device in response to a communication request initiated by the client device. The apparatus also includes a passcode generation module configured to generate a passcode. The apparatus further includes an encryption module configured to encrypt dynamically generated authenticating information associated with the client device and store the authenticating information in the database. The handshake module is further configured to forward authenticating information associated with the client device and the communication request to an interactive response server, in order to enable enhanced communications between the client device and the interactive response server.

Another embodiment includes an apparatus for providing enhanced communications includes an client-side handshake module configured to provide identifying information associated with a client device to a data server via a data channel. The client-side handshake module is further configured to receive authenticating information from the data server via the data channel. The apparatus also includes a communications enhancement module configured to provide the authentication information from the data server to an interactive response server to enable enhanced communications between the client device and interactive response server. It can be appreciated that recited modules of the apparatus or system can be combined into one or more modules.

In another embodiment, an apparatus for providing enhanced communications includes an automatic numbering identification reception module configured to receive identifying information from a client device and forward it to the client-side handshake module. The apparatus further includes an client-side handshake module configured to obtain identifying information associated with a communications request initiated by a client device from a data server. The apparatus further includes a passcode reception module configured to obtain authenticating information associated with the client device from the client device. The apparatus further includes a passcode comparison module configured to determine whether the identifying information matches the authenticating information. The apparatus also includes a voice communications module configured to establish enhanced communications with the client device using the information obtained from the data server if the comparison module determines a match. It can be appreciated that recited modules of the apparatus or system can be combined into one or more modules.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 8 is a block diagram of an example embodiment of communications between a client device, data server, and interactive response server.

FIG. 10 illustrates a computer network or similar digital processing environment in which embodiments of the present invention may be implemented.

DETAILED DESCRIPTION OF THE INVENTION

Figure 1:
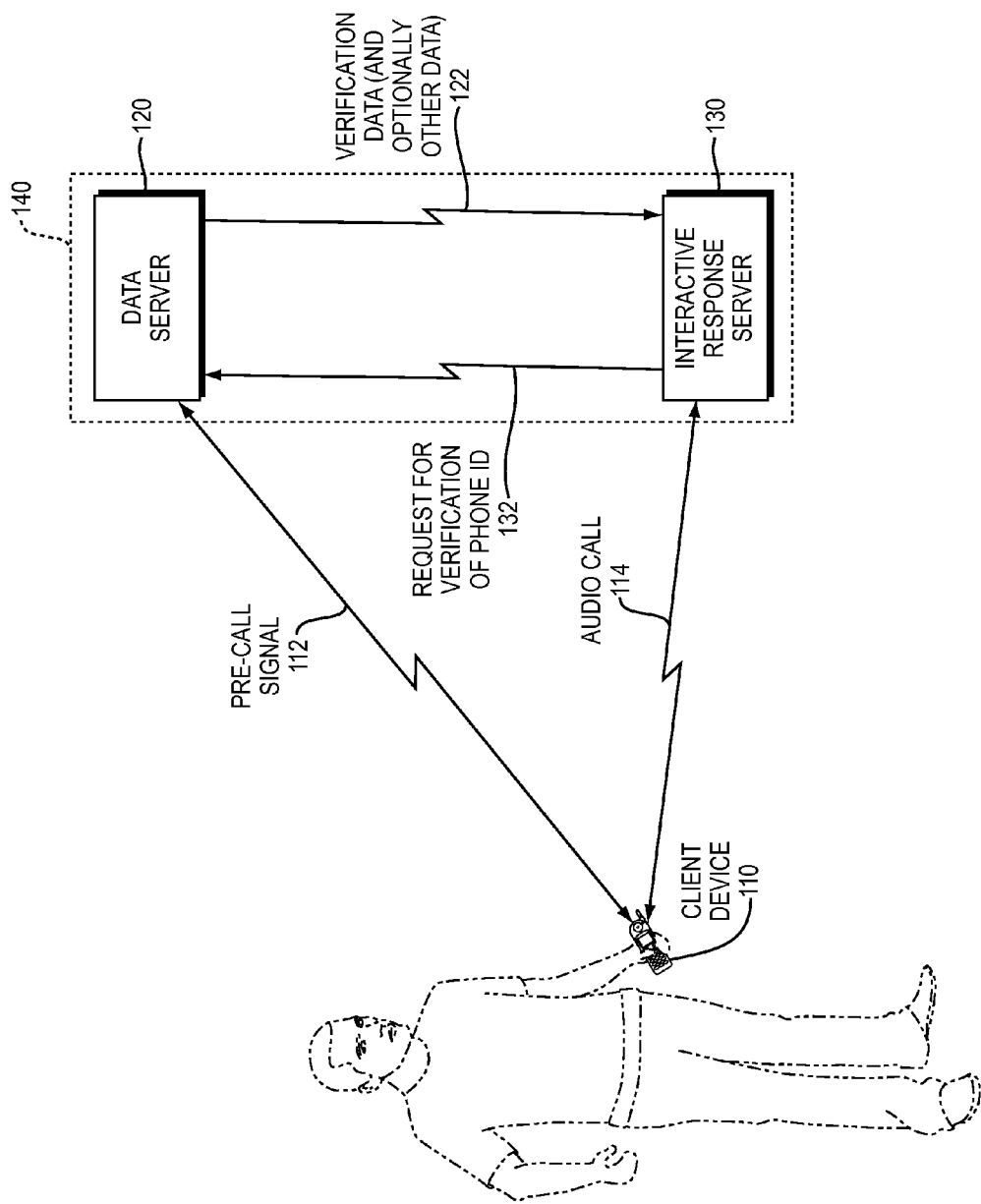
FIG. 1 is a block diagram of an example embodiment of the present invention illustrating network activities employed to improve interactions between a user and an interactive response server of a call center.

A description of example embodiments of the invention follows.

An example embodiment of the present invention relates to facilitating communications between a client device and a call center by using a data channel in operative arrangement with a communications channel, such as a voice-band channel. In one embodiment, the communications between the client device and the call center can be seen as a secure dual channel dialog. When a client device initiates a communications request, the client device first transmits information regarding the communications call or client device to a data server over a data channel. The data server collects, authenticates, and/or validates the information and, upon a request from the interactive data server, forwards whether the caller has been validated. The interactive data server provides enhanced communications with the client device based on the validated information.

Some telephone or cellular networks support providing only one active channel to a user's client device/phone. In such a network, a user may initiate a data channel connection to a server, or an audio call, but not both at the same time. The communications that the system described herein facilitates opening a data channel connection, transferring necessary data to identify the user over the data channel, terminating the data channel connection, and initiating the audio call having identified the user.

The client device and interactive response server may be coupled via a bandwidth-limited communications channel. The bandwidth-limited communications channel may be a wired or wireless telephony channel. In certain embodiments, once a user calls a call center or business (e.g., once a request for initiating a communications request by the client device is established), a data channel between the client device and the data server is employed. The data server may be dynamically assigned to the client device using information associated with the client device, where the dynamic assignments may be based on global positioning information or base station information through which the client device accesses the wireless network.

In one embodiment, after establishing the data channel, the client device forwards authentication information, authenticating the communication request, to the data server through the data channel. The authentication information may be forwarded automatically or in response to a request from the data server. In some embodiments, the authentication information may include at least one of an encrypted passcode, or one or more identifiers associated with the client device. In certain embodiments, the authentication information may be a telephone number associated with the client device. In some embodiments, in addition to authentication information, any amount of other information that is potentially relevant to the voice call about to begin may be transmitted. For instance, the GPS location of the caller, or a website owned by or related to the called party may be transmitted.

Once the data server authenticates the communications request from the client device (which may involve additional communications between the client-side handshake module and the server-side handshake module), a communications channel, such as a voice-based channel, between the client device and the interactive response server may be established. Once the voice-based channel is opened, the data channel may be dropped, or if network signaling so allows, the data channel may remain open simultaneous with the voice-based channel being open. The interactive response server asks for and receives the authentication of the client device and its caller obtained by the data server, and may additionally receive other information provided by the client device to the data server, such as the client device's GPS coordinates. The interactive response server validates and facilitates the communications request initiated by the client device based on the information. The communications between the client device and the interactive response server may occur in the form of voice-band communications.

FIG. 1 is a block diagram of an example embodiment of the present invention. The block diagram includes a client device 110 employed by a user, a data server 120, and an interactive response server 130 of a call center 140. It should be understood that the client device 110 and interactive response server 130 may be used by other parties or provide other forms of service. A user indicates to the client device (e.g., by dialing a phone number) that she wants to contact the call center. Before the client device 110 initiates a call to the call service center 140, the client device 110 sends a pre-call signal 112 over a data channel to the data server 120. The pre-call signal 112 transmitted over the data channel includes an identification number (not shown) of the client device 110. The data server 120 looks up the identification number of the client device 110 to determine whether the identification number is registered in a database (not shown) of the data server 120, which is shown and described in more detail below in reference to FIGS. 6A-C.

Continuing to refer to FIG. 1, in one embodiment, if the identification number is registered in the database, the data server 120 generates a random passcode (not shown) and encrypts the random passcode using information unique to the client device 110 as an encryption key. The data server 120 transmits the encrypted passcode (not shown) to the client device 110 over the data channel 112. The client device 110 decrypts the encrypted passcode using its unique information as the decryption key. Alternatively, the client device 110 does not decrypt the passcode and forwards the encrypted passcode to the interactive response server 130 during further communications. At this point, the client device 110 and the data server 120 may exchange additional information (not shown) so as to relieve the need for the user to provide it to the interactive response server 130 during the upcoming voice call. For instance, the data server may deliver a challenge question or ask for a voiceprint that can only be legitimately returned by the registered owner of client device.

The client device 110 then initiates a voice call over a voice-band channel 114 with the interactive response server 130. This communication delivers two pieces of information to the interactive response server 130: an unsecured ID for the client device, such as the device's ANI, and the decrypted passcode that had been generated by the data server 120. In one embodiment, the ANI for the client device is delivered by the telephony network itself, and the client device 120 transmits the passcode over the voice-band channel 144 using a dual-tone multi-frequency (DTMF) signal or other form of voice-based encoding. The interactive response server 130 then sends a request for verification 132 to the data server 120, which includes the ANI and the decrypted passcode provided by the client device. The data server 120 retrieves the identification number and corresponding generated passcode from the database and confirms whether the identified device has delivered the correct passcode. The data server 120 transmits verification data 122 to the interactive response server 130. In addition to the verification data 122, the data server 120 may return, to the interactive response server 130, any information provided to it by the client device 110 in the pre-call data exchange.

For calls where the data server 120 confirms the identity of the client device 110, the interactive response server 130 may thereafter proceed with the call as if client device had been securely verified. The interactive response server 130 then proceeds with the voice call using the identification verified by the identification number and passcode to personalize the call to the user of the client device 110, which is another form of enhanced communications.

In addition, the pre-call data transfer can additionally securely identify the user of the client device. In one embodiment, for example, the client device 110 prompts the user to speak a passphrase, records it, and ships it over the data channel to the data server 120, where it can be compared against biometric information from the user stored previously on the data server 120. In this setup, the data server 120 is able to validate both the device and its current user for the interactive response server 130, without the interactive response server 130 requiring anything from the user over the voice channel.

In some embodiments, the call can proceed with non-enhanced communications for an unregistered device, or for a device and/or user that has not been validated by the data server 120. In other embodiments, the call may be disabled absent an override by providing another form of identification, optionally at the start of the call via the voice-band channel. In the latter case, a successful override can be used to cause the data server 120 to update the database for future automatic enhanced communications for the client device 110.

Figure 2:
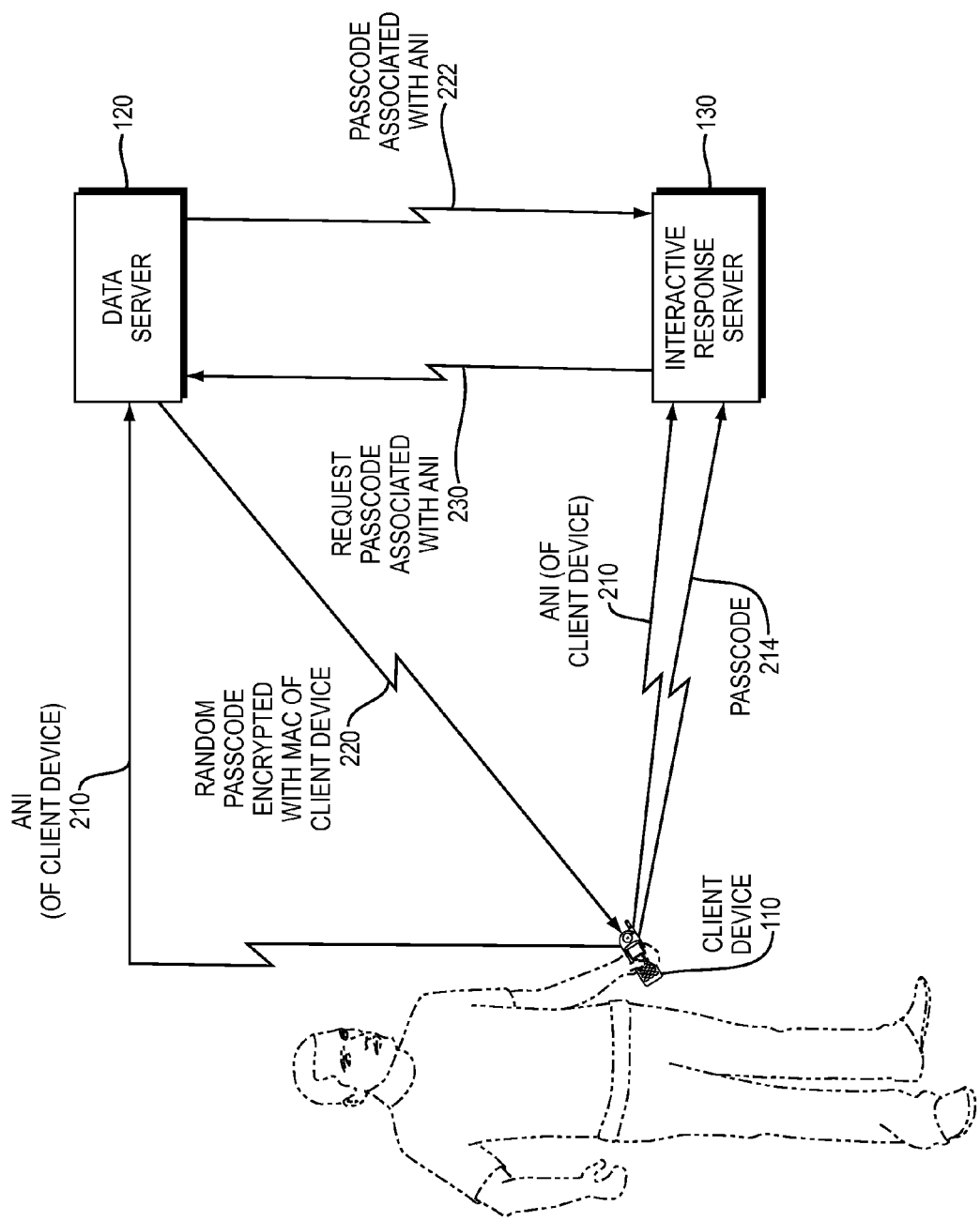
FIG. 2 is a block diagram of another example embodiment of the present invention illustrating network activities employed to improve interactions between a user and an interactive response server of a call center.

FIG. 2 is a block diagram of another example embodiment of the present invention. The client device 110 begins the call by sending its automatic numbering identification (ANI) 210 to the data server 120. ANI is a feature of telephone networks that transmits the billing telephone number of the calling party. The ANI 210 serves as the identification number of the client device 110, as described above in reference to FIG. 1. Thereafter, the data server 210 determines whether the ANI 210 is registered in a database. If the ANI 210 is registered, the data server 120 retrieves a media access control (MAC) address corresponding to the ANI of the client device 110 from the database (not shown), generates or otherwise provides an unencrypted passcode 222, and encrypts the unencrypted passcode 222 into an encrypted passcode 220 using the MAC address as an encryption key. In one embodiment, the unencrypted passcode 222 is generated randomly. In other embodiments, the unencrypted passcode 222 is obtained from a list of available passcodes or is calculated based on information, such as the ANI, telephone number, or geoposition of the client device 110, for example.

In the illustrated embodiment, the data server 120 returns an encrypted passcode 220 to the client device 110. The client device 110 then initiates a call with the call center by opening a data channel with the data server 120. The client device 110 transmits its ANI 210 to the data server 120. The data server 120 retrieves the ANI 210 of the client device 110, an unencrypted passcode 222 associated with the ANI 210, e.g., an unencrypted version of the encrypted passcode 220, from the database. At this point, the client device 110 decrypts the encrypted passcode and transmits the decrypted passcode 214 to the data server 120. If the decrypted passcode 214 matches the unencrypted passcode 222, the data server 120 verifies the identity of the client device 110. The data server 120 can also download other pertinent information from the client device 110, such as GPS location/geoposition. The data server 120 then sends the verification to the interactive response server 130, which switches the call from the data channel to the audio channel and continues the call normally, optionally with enhanced communications.

Figure 3:
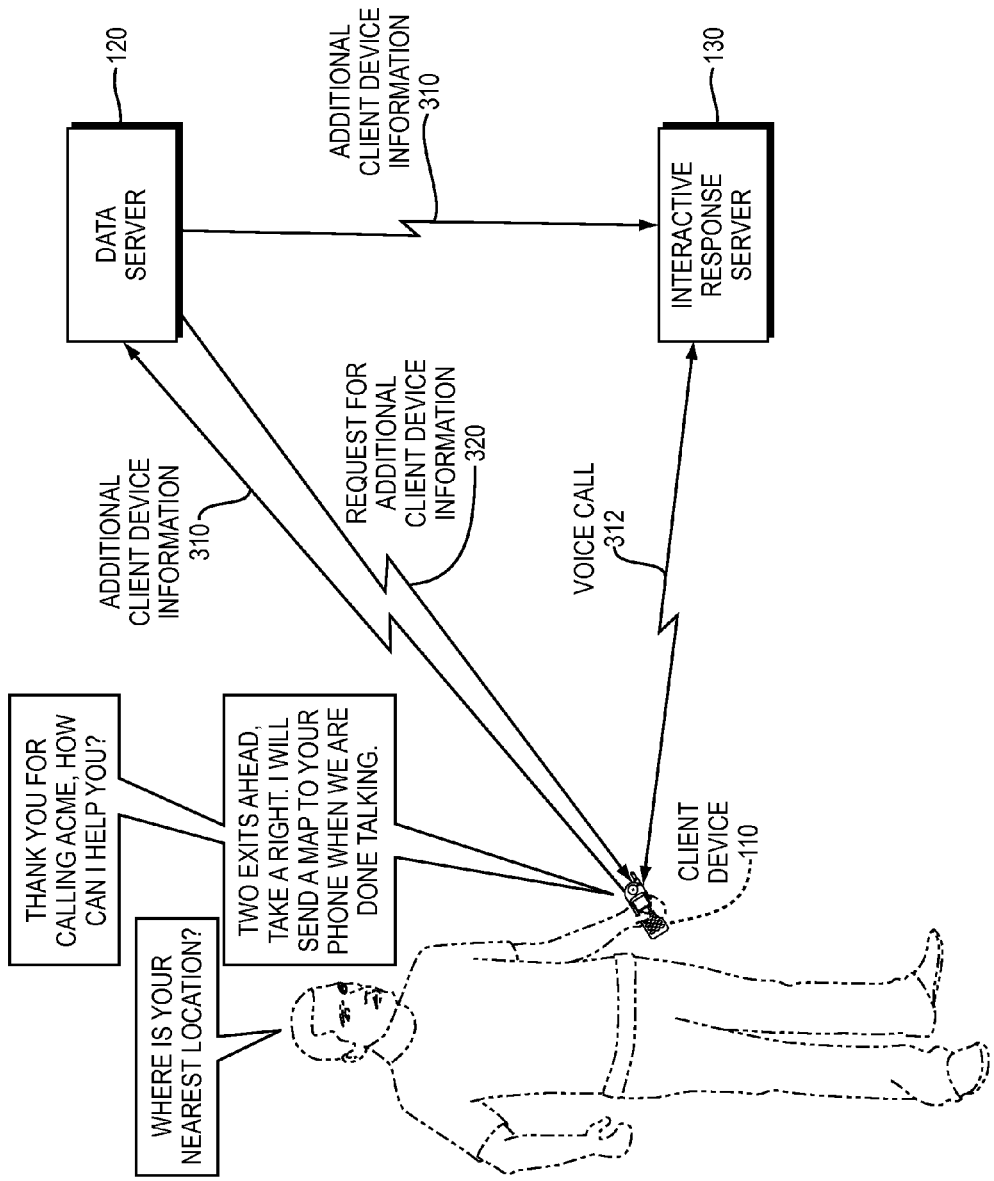
FIG. 3 is a block diagram of an embodiment of the invention that provides additional information over data channels to the call center.

FIG. 3 is a block diagram of an embodiment of the invention in which the client device 110 provides additional information over data channels to the call center. In this embodiment, the data server 120 requests additional client information 310 from the client device 110. The data server 120 requests additional information before the call begins or, if the cellular/telephony network provides support for simultaneous audio and data channels, during the call, on-demand. For example, the client device 110 initiates a voice call 312 with the interactive response server 130 after the data server 120 has verified the client device 110. During the voice call, an example conversation may be as follows: the interactive response server 130 first states "thank you for calling ACME, how may I help you?" The user, through the client device 110, replies, "where is your nearest location?"

At this point, the interactive response server 130 determines that it needs a location of the client device 110 to describe its company's location relative to that of the client device 110, and issues a corresponding request for information 320 to the data server 120. The data server 120 forwards the requested information to the interactive response server 130, where additional client device information 310 has been downloaded from the client device 110. In a network that allows simultaneous data and audio channel connections, however, the client device 110 can receive the request for information 320 and, in turn, transmit the additional client device information 310 to the data server 120. In either case, the data server 120 forwards additional client device information 310 to the interactive response server 130. Based on the additional client device information 310, the interactive response server 130 replies to the user with the nearest location, and/or directions to reach the nearest ACME location. A person of ordinary skill in the art can appreciate that location of the client device 110 is not the only type of additional information that a call center may request from the client device 110. For example, the interactive response server 130 can send picture data to the client device 110 by after the voice call 114 terminates, or during the call in a supported network. For example, the interactive response server 130 can send a map to the user illustrating his location and the location of the nearest branch.

Figure 4:
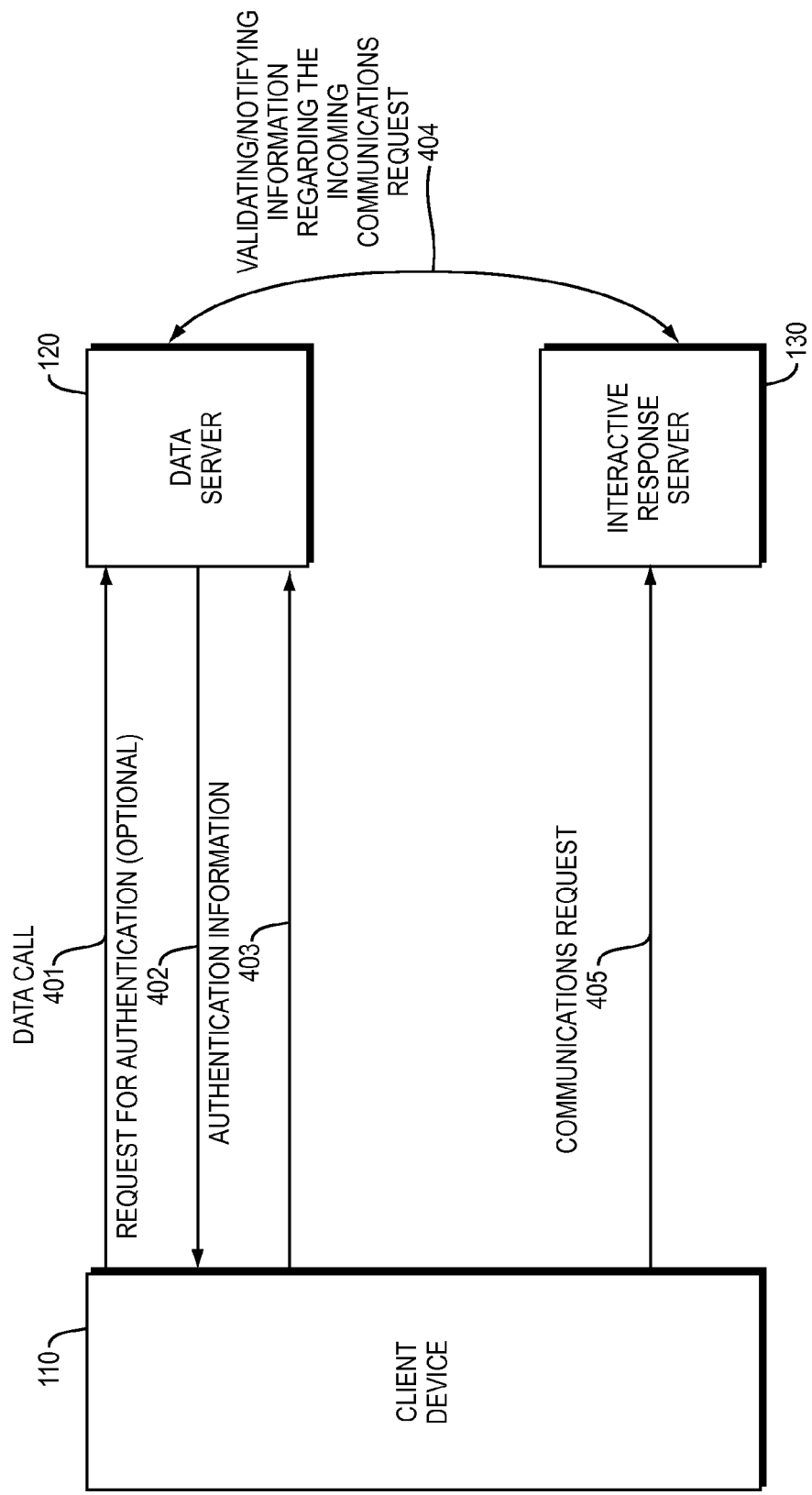
FIG. 4 is a flow diagram illustrating procedures for providing enhanced communications according to an example embodiment.

FIG. 4 is a flow diagram illustrating procedures for providing enhanced communication according to an example embodiment. In order to provide enhanced communications, a data channel for a data call 401 is established between a client device 110 and a data server 120. The data server 120 may request information 402 (such as validating or authenticating information) from the client device 110. The data server 120 receives the authentication information 403, validates or analyzes the information, validates the user based on the information 404 associated with the client device 110 and the communication to the interactive response server 130 for use in providing enhanced communications between the client device 110 and the interactive response server 405. In certain embodiments, the data server 120 may access a database that includes information regarding the client device 110 to validate and/or authenticate the communications request.

Figure 5:
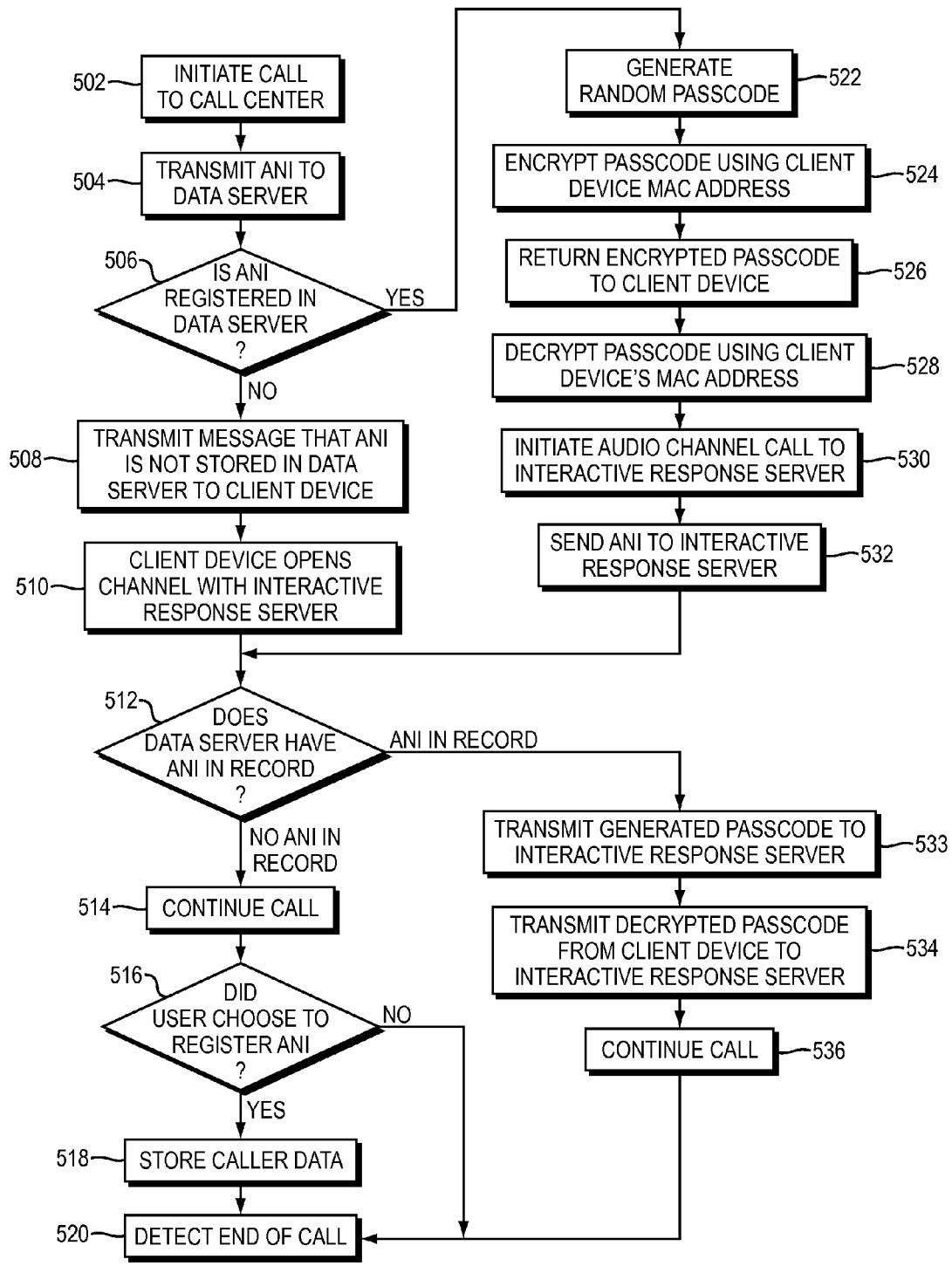
FIG. 5 is a flow diagram of method used to implement an embodiment of the present invention.

FIG. 5 is a flow diagram of method used to implement an embodiment of the present invention. A user begins the process by calling the call center, which opens a data channel before opening an audio channel (502). The user's client device transmits the ANI number of the client device to a data server over the data channel, with the audio channel unopened (504). The data server then determines whether the ANI number is registered in the data server (506). If the ANI number is not registered in the data server, the data server transmits a message that the ANI number is not stored in the data server to the client device over the data channel (508). Next, the client device closes the data channel and opens the audio channel/a voice-band channel with the interactive response server (510). Then the interactive response server requests information about the ANI number from the data server (512).

If the ANI number is not registered with the data server (512), the interactive response server continues with the call (514). After the call concludes, the interactive response server prompts the user to register the ANI number of the client device (516). If the user chooses to register the ANI number, the interactive response server stores the already retrieved caller data in the database in the data server (518). The data server records both the client device's ANI number and MAC address in the database instead of in a temporary record, and the interactive response server detects the end of the call (520). Should the user choose not to register the ANI of the client device (516), the interactive response server detects the end of the call (520).

If the data server determines the ANI number is, in fact, registered in the data server (506), the data server generates a random (or otherwise generated or obtained) passcode (522). The data server encrypts the passcode using the client device's MAC address as the encryption key (524). The data server transmits the encrypted passcode to the client device (526). The client device decrypts the encrypted passcode using the client device's MAC address as the decryption key (528). Then, the client device initiates a voice call to the interactive response server (530). The client device sends the ANI number to the interactive response server (532). The interactive response server asks the data server to send information about the ANI number to the interactive response server (512). If the ANI number is registered, the data server transmits the generated passcode to the interactive response server (533). The client device then transmits the passcode to the interactive response server over the voice channel, using, for example, dual-tone multi-frequency signaling (534). The interactive response server continues with the call (536). When the call ends, the interactive response server detects the end of the call (520).

Figure 6A:
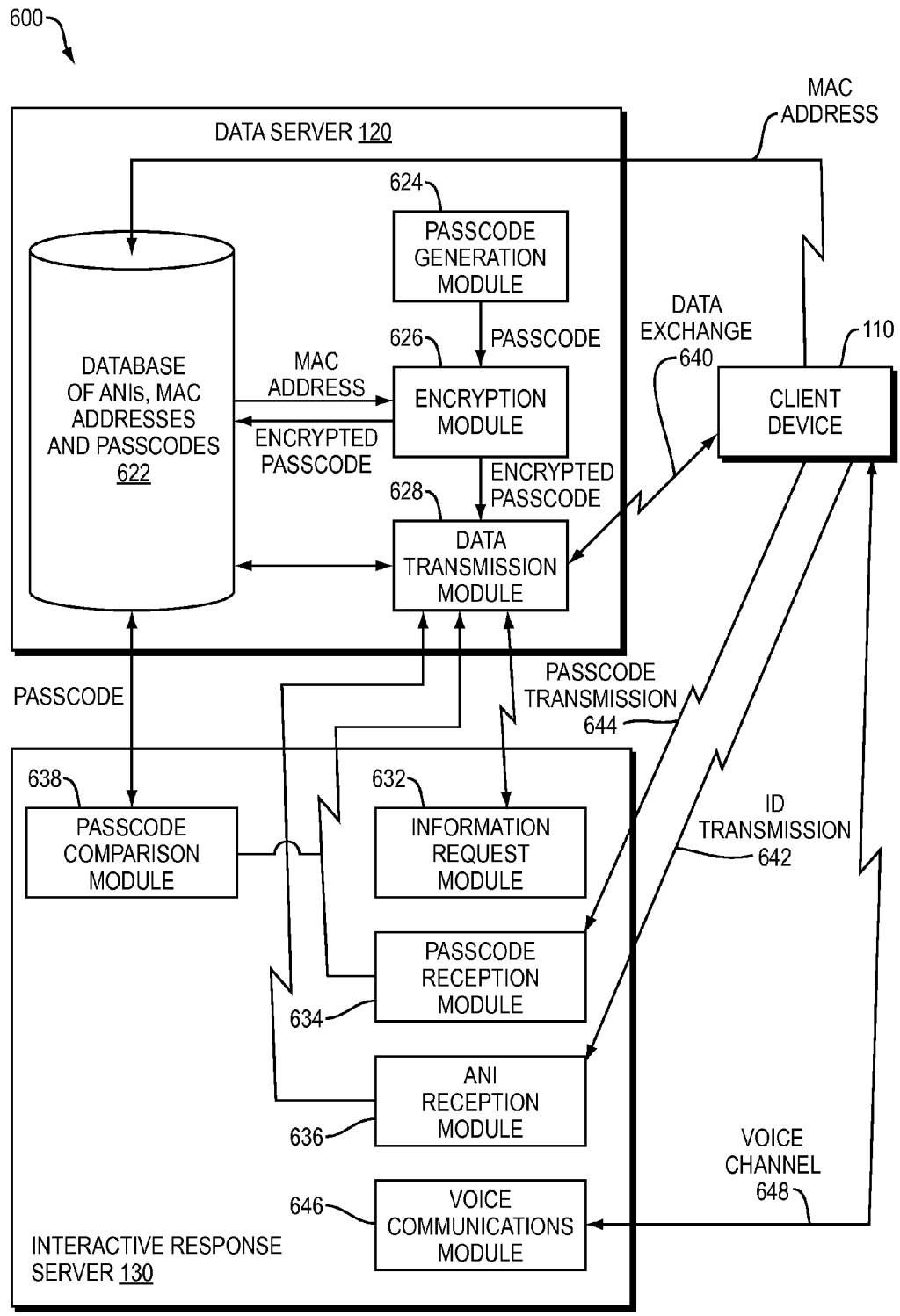
FIG. 6A is a block diagram of an example embodiment of a client device data server and an interactive response server.

FIG. 6A is a block diagram 600 of an embodiment of a client device 110, data server 120, and an interactive response server 130. The data server 120 includes a database 622, a passcode generation module 624, an encryption module 626, and the data transmission module 628. The database 622 stores ANI numbers, corresponding MAC addresses, and generated passcodes. After the data server 120 receives an ANI number known in the database 622, the passcode generation module 624 generates a random passcode (or otherwise provides a passcode) and transmits the passcode to the encryption module 626. The encryption module 626 receives a MAC address from the database 622 and encrypts the received passcode using the MAC address as an encryption key. The encryption module transmits the encrypted passcode to the database 622 for storage in the record of the corresponding ANI number and the data transmission module 628 for transmission to the client device 110.

The interactive response server 130 includes an information request module 632, passcode reception module 634, ANI number reception module 636, passcode comparison module 638, and voice communications module 646. The ANI number reception module 636 receives an ID transmission 642 from the client device 110. The ANI number reception module 636 transmits the ANI number to the data transmission module 628 of the data server 120. The data transmission module 628 retrieves the passcode of the ANI number from the database 622 and transmits the passcode to the passcode comparison module 638 of the interactive response server 130. Then, the interactive response server 130 receives a passcode transmission 644 from the client device 110 at the passcode reception module 634. The passcode reception module 634 then transmits the received passcode to the passcode comparison module 638. The passcode comparison module 638 compares the passcode received from the data server 120 to the passcode received from the client device 110. If both passcodes match, the interactive response server 130 verifies that the ANI number of the client device 110 is authentic. After verification, the information request module 632 sends requests to the data transmission module 628 of the data server 120. The data transmission module 628 sends and receives requests for additional data over data exchange 640 to the client device. An example of additional data is the location of the client device 110. The voice communications module enables providing enhanced communication with the client device 110.

Upon registration enrollment, the client device 110 can send its MAC address to the database 622 of the data server 120. During enrollment, the data server 120 creates a new record in the database 622 to store the client device's ANI number and MAC address because the database 622 is not storing that information, since the ANI number is not found in the database 622. The client device 110 sends its MAC address to the database 622 when the database 622 is not storing a record of the ANI number, and the interactive response server 130 indicates that the user wants to register with the secure registration system. The client device 110 sends its MAC address over a data exchange communications path 640 to the data transmission module 622 for storage in a record corresponding to the client device's 110 ANI number.

Figure 6B:
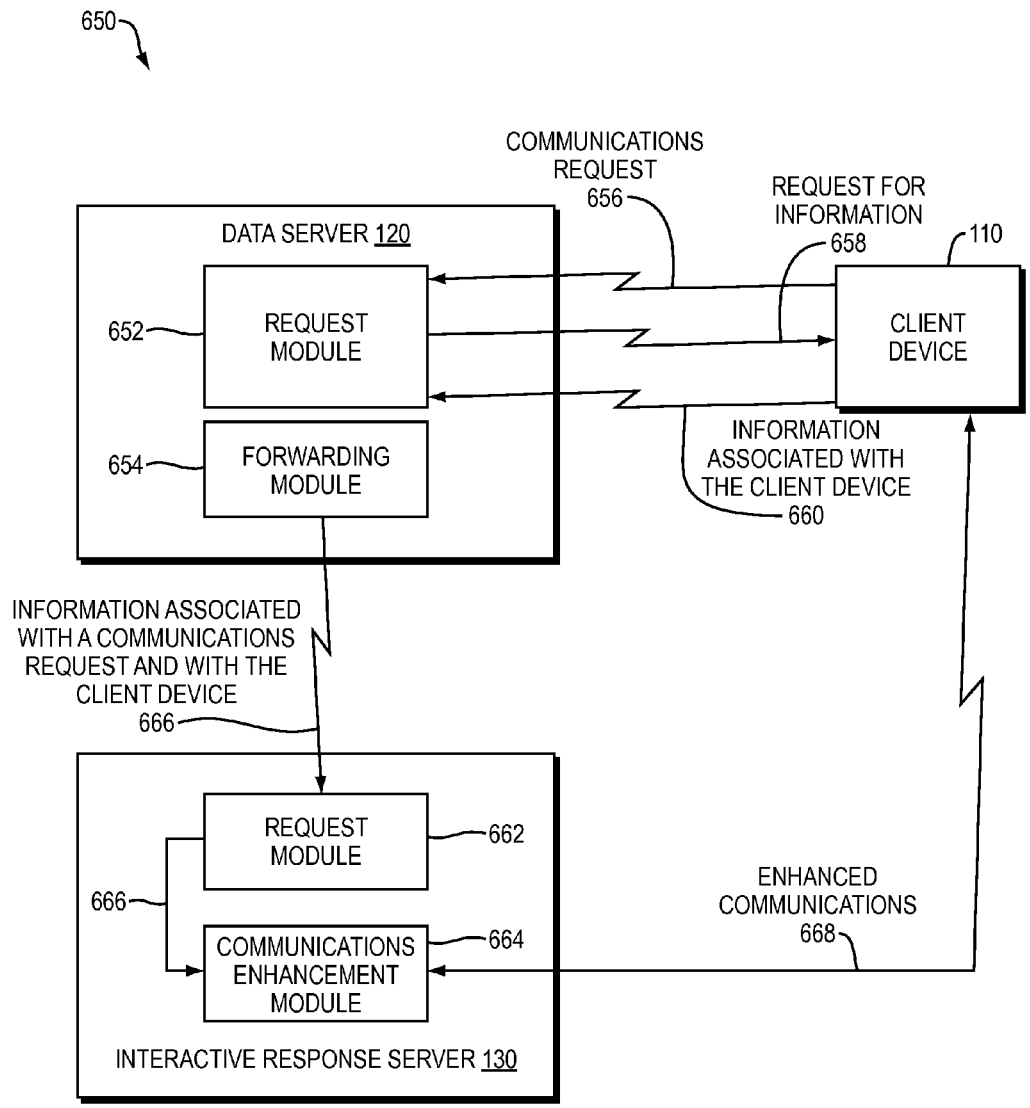
FIG. 6B is a block diagram of another embodiment of a client device, data server and an interactive response server.

FIG. 6B is a block diagram 650 of another embodiment of a client device 110, data server 120, and interactive response server 130. In this embodiment, the data server 120 includes a request module 652 and a forwarding module 654. The request module sends a request for information 658 to the client device 110 responsive to a communications request 656 by the client device 110. The client device replies with information associated with the client device 660. Then, a forwarding module 654 forwards information associated with a communications request and the client device 666 to a request module 662 of the interactive response server 130. The request module sends the information associated with a communications request and the client device 666 to a communications enhancement module 664. The communications enhancement module then establishes enhanced communications 668 with the client device 110. A person of ordinary skill in the art can appreciate that the modules described in FIG. 6B can interact with, be encompassed within, or include the modules described in FIG. 6A in various configurations.

Figure 6C:
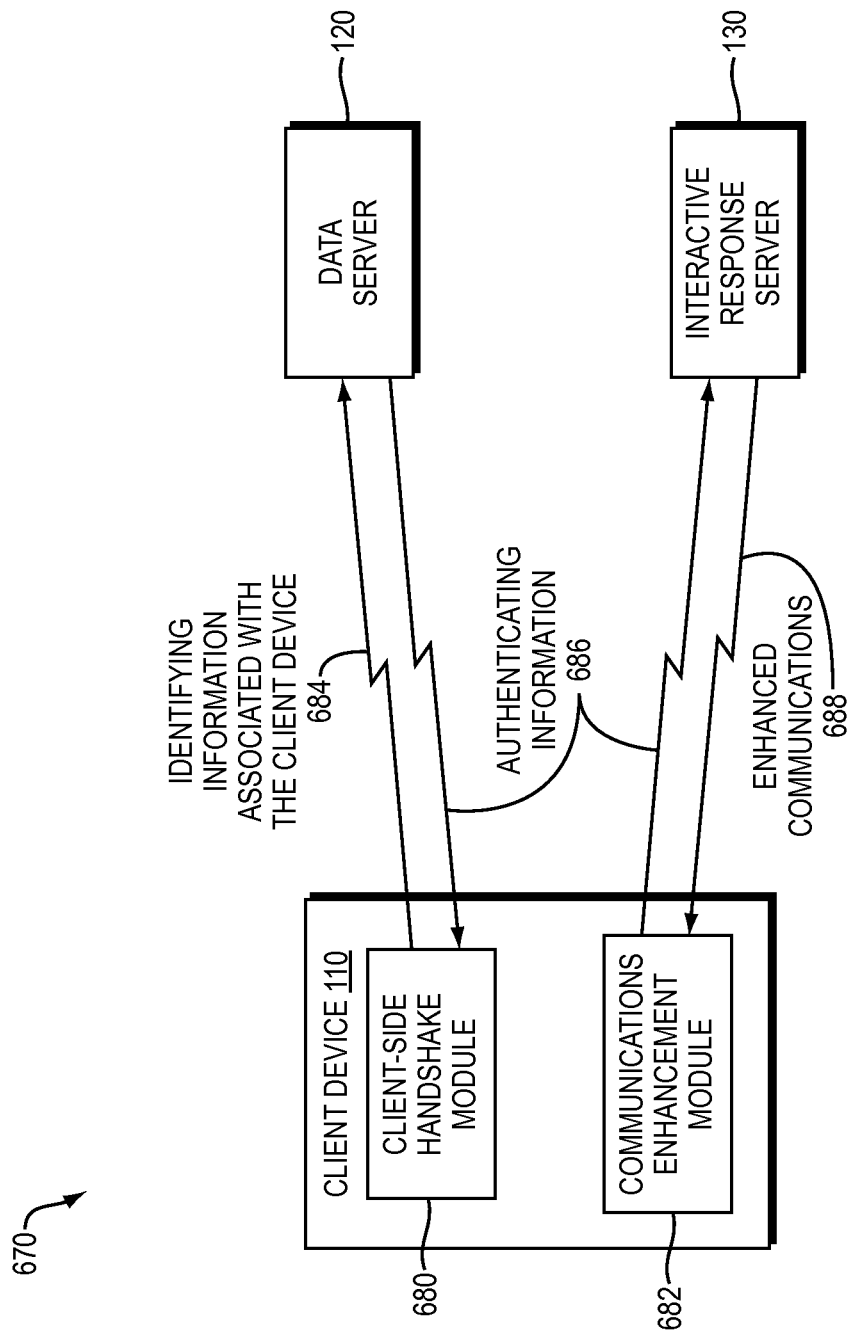
FIG. 6C is a block diagram of another embodiment of a client device, data server and an interactive response server.

FIG. 6C is a block diagram 670 of a client device 110, data server 120 and an interactive response server 130. The client device 110 includes a client-side handshake module 680 and a communications enhancement module 682. The client-side handshake module 680 is configured to send identifying information associated with the client device 684 to the data server 120 over a data channel. The data server 120 responds by transmitting authenticating information 686 to the client-side handshake module 680. The communications enhancement module 682 then forwards the authenticating information 686 to the interactive response server 130, which enables enhanced communications 688 between the client device 110 and interactive response server 130.

Figure 7:
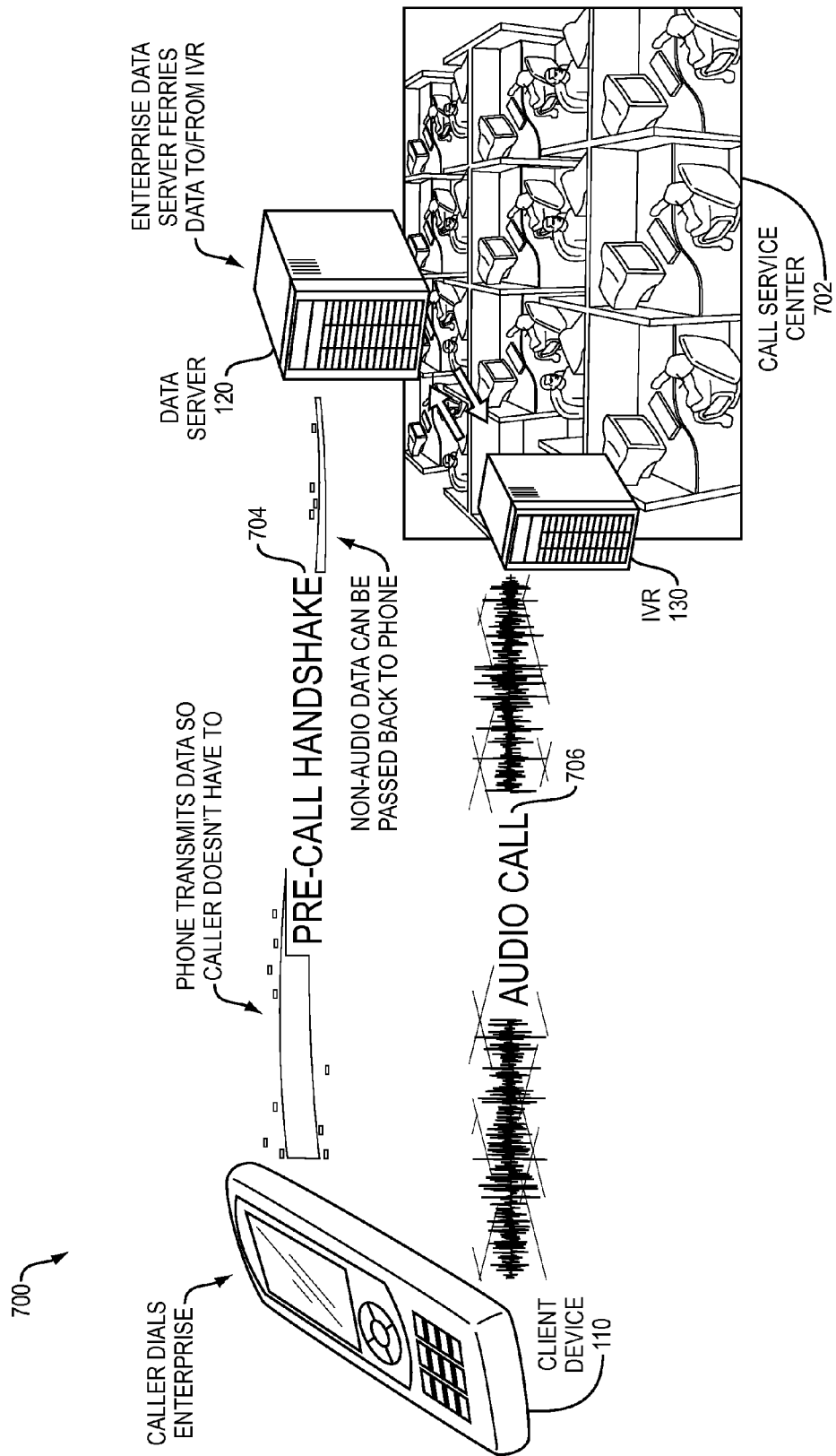
FIG. 7 is a block diagram of an example embodiment of communications between a client device, data server, and interactive response server.

FIG. 7 is a block diagram 700 of an example embodiment of communications between a client device 110, data server 120, and interactive response server 130. The client device 110 calls a call service center 702. Before initiating the call, the client device 110 initiates a pre-call handshake 704 with the data server 120 of the call service center 702 over a data channel. The client device 110 transmits data to the data server 120 during the pre-call handshake 704 so the user of the client device 110 does not have to input such data during the call. The data server 120 transmits non-audio data to the client device 110 over the pre-call handshake 704. Meanwhile, the data server 120 exchanges related data with the interactive response server 130, as described in the example embodiments in this application. Upon termination of the pre-call handshake 704, the client device 110 terminates the data channel connection and initiates an audio call 706 with the interactive response server 130 of the client service center 702, on which the user can communicate with the call service center 702 using enhanced communications.

FIG. 8 is a block diagram 800 of an example embodiment of communications between a client device 110, data server 120, and interactive response server 130. The client device 110, for example, a smartphone, sends a pre-call signal 802 to the data server 120. The client device 110 further initiates an incoming call 810, e.g. a voice call, to the interactive response server 130. The interactive response server 130 sends a request for verification 804, from the data server, of an identifier included in the incoming call 810. Should the data server verify the identifier, the data server returns a verification 806 of the identifier to the interactive response server 130, where the verification 806 can include additional data regarding the user, or the account of the user, of the client device 110.

Figure 9A:
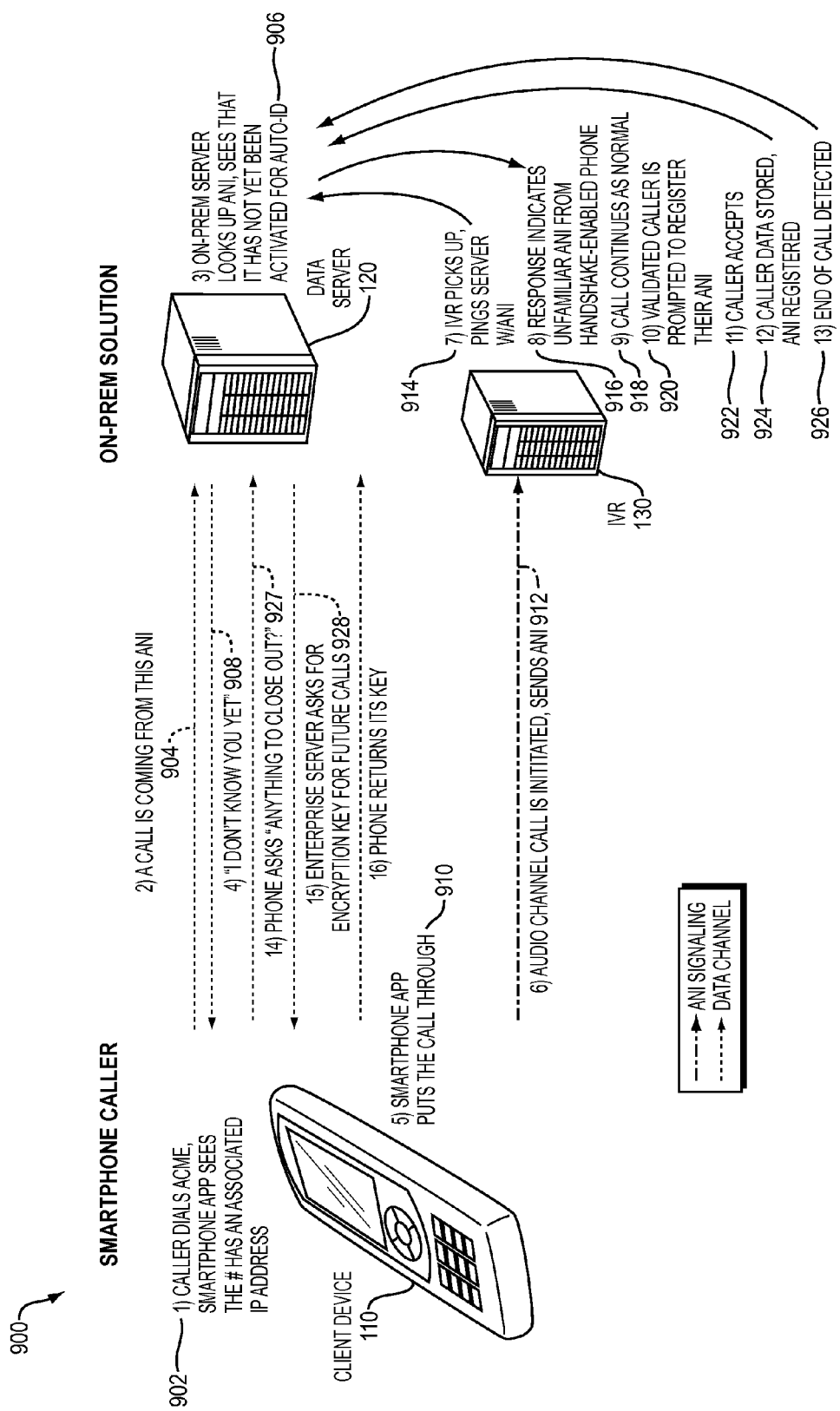
FIG. 9A is a block diagram of an example embodiment of communications registering client device with data server and interactive response server for enhanced communications.

FIG. 9A is a block diagram 900 of an example embodiment of communications for registering the client device 110 with data server 120 and interactive response server 130 for enhanced communications. Upon the client device 110 calling a particular call service center, an application, or "app," configured to run on the client device 110 initiates a data channel with the data server 120 before initiating an audio channel connection (902). The client device 110 then transmits its ANI to the data server 120 over the data channel, indicating that a call is originating from the client device 110 with that ANI (904). The data server 120 looks up the received ANI, and determines it is not yet activated for enhanced communications, and thus, registration of the ANI is needed (906). The data server 120 transmits a signal to the client device 110 indicating that the ANI of the client device 110 is not yet registered (908). Upon receiving this signal, the client device 110 calls the interactive response server 130 of the call service center (910). The client device 110 and interactive response server 130 initiate an audio channel, and the client device 110 sends its ANI to the interactive response server 130 (912). The interactive response server 130 answers the call, receives the ANI over the audio channel, and pings the data server 120 with the ANI (914). The data server 130 responds to the interactive response server 130 that the ANI has not yet been activated (916). The interactive response server 130 continues the call normally (918). The user is then prompted to register the ANI of the client device 110 for enhanced communications (920). Should the caller accept (922), the interactive response server 130 sends caller data (e.g., the ANI) to be stored in the data server 120 (924). Should the client device 110 end the call, the interactive response server 130 transmits an end-of-call signal to the data server 120 (926). The client device then, after the audio channel has been terminated, re-initiates the data channel tih the data server 120 and asks the data server 120 if it needs any further information (927). The data server responds by requesting for an encryption key for future calls (928). The phone then sends its encryption key (e.g., the MAC address of the client device) to the data server (930).

Figure 9B:
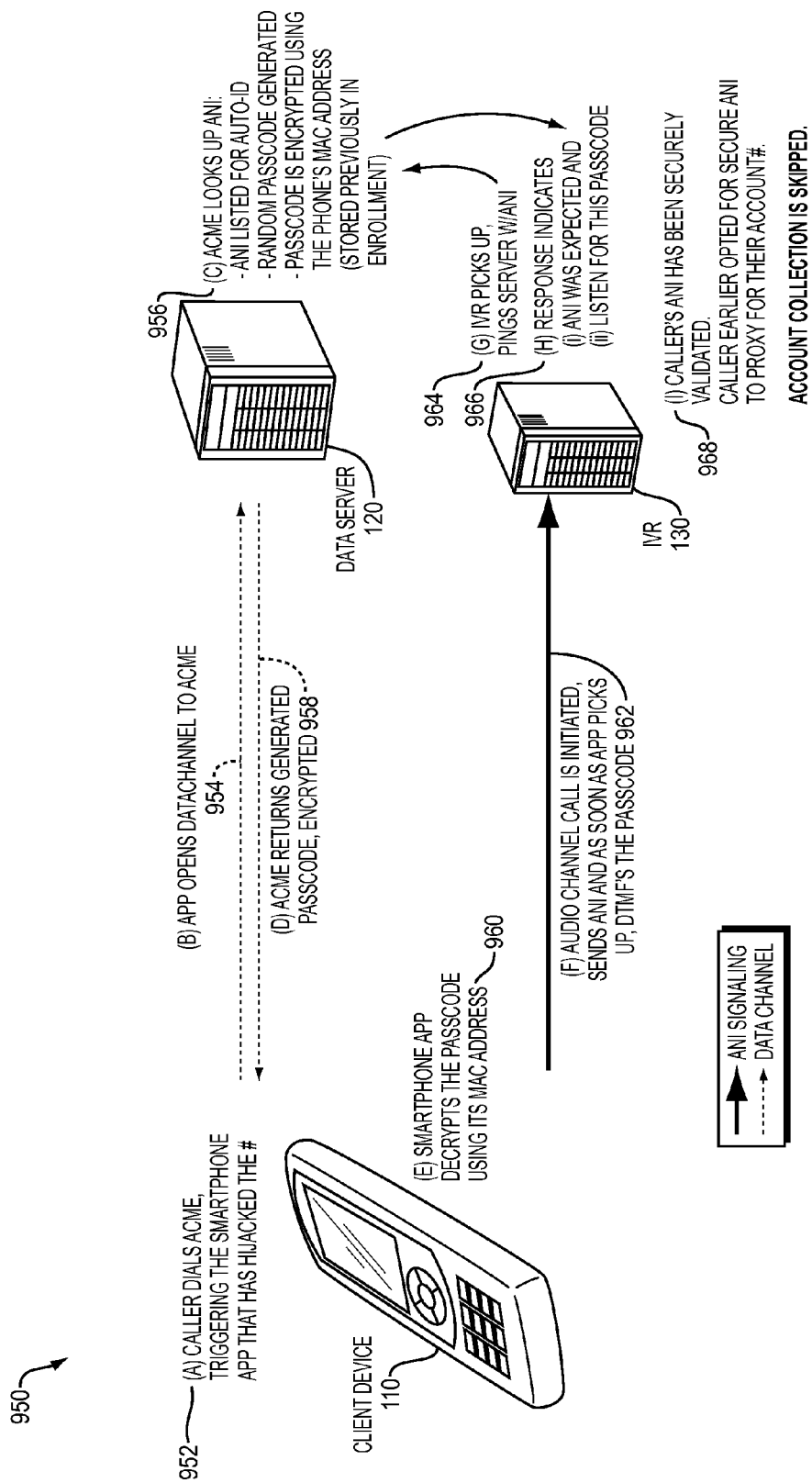
FIG. 9B is a block diagram of an example embodiment of communications using registered enhanced communications between client device, data server and interactive response server.

FIG. 9B is a block diagram 950 of an example embodiment of communications using registered enhanced communications between client device 110, data server 120 and interactive response server 130. Upon the client device 110 calling a particular call service center, an application, or "app," configured to run on the client device 110 initiates a data channel with the data server 120 before initiating an audio channel (952). The client device 110 then transmits its ANI, along with any additional information that the interactive response server 130 can use, such as the device's GPS co-ordinates and user credentials, to the data server 120, indicating that a call is originating from the client device 110 with that ANI (954). The data server 120 looks up the received ANI, and determines it is activated for enhanced communications (956). The data server 120 generates a random passcode, and encrypts the passcode using the phone's MAC address, which was previously stored during enrollment (956). The data server 120 returns the generated, and encrypted, passcode to the client device 110 (958). The client device 110, using the application, decrypts the passcode using its MAC address as the decryption key (960). The client device 110 initiates an audio channel with the interactive response server 130, sends its ANI, and, using DTMF or other form of voice-based encoding, sends the decrypted passcode (962). The interactive response server 130 then asks the data server 120 to verify that the received ANI and the received decrypted passcode match (964). The data server 120 responds that the ANI is validated and sends the additional information volunteered by the client device 110 when it just communicated with the data server (966). Account information does not have to be manually collected from the user (968).

In networks and client devices in which data and voice can be transmitted simultaneously, the data channel can additionally be open during the phone call to transmit additional data.

In some embodiments, the user can control which additional information is shared with the interactive response server 130. The user can choose or has an option to share the additional information, such as location.

Using ANI numbers to verify a customer's identity is performed in one embodiment because ANI numbers represent a 1:1 mapping in a business' customer database. However, ANI numbers are not entirely secure because they can be faked or spoofed. The example handshake described in the present application makes the ANI numbers secure from such spoofing because of the validation code. The validation code is unique to the user's phone because the user typically is in possession of his phone, the decryption key for data server communications with the user's phone is not publicly available and not easily discovered, and such faking or spoofing from another phone does not defeat the verification system. Such a system can partially or completely replace a user account ID collection because the secure ANI system can replace an account ID. This increases automation rates and caller satisfaction, and decreases call duration. In another embodiment, the embodiments described herein can be combined with biometric or voice authentication at the client device, data server, or interactive response server to increase security.

In one embodiment, the system can be an "app" (or application) on a user's client device 110. The app can be updated periodically or in real-time with businesses that use the handshake process, and redirect the phone to the secure handshake server (for example, the data server 120). The app routes calls to numbers of eligible businesses to perform the handshake with the IP address of the data server listed in the application's database. The user or caller does nothing differently after the application is installed because the application transfers the call to the data center automatically.

In another embodiment, the system can offer at least one level of service based on the user's ANI number. The system can provide multiple levels of service to certain users based on factors, such as paying a fee for premium service, group association, or other factors.

Embodiments or aspects of the present invention may be implemented in the form of hardware, software, or firmware. If implemented in software, the software may be any form of software capable of performing operations consistent with the example embodiments disclosed herein. The software may be stored in any non-transient computer readable medium or computer readable storage medium, such as RAM, ROM, magnetic disk, or optical disk. When loaded and executed by processor(s), the processor(s) are configured to perform operations consistent with the example embodiments disclosed herein. The processor(s) may be any form of processor(s) capable of being configured to execute operations as disclosed herein.

Further, it should be understood that the interactive response server 130 can be any form of network node configured to provide communications services for a client device 110. Likewise, the client device 110 can be any form of client device that provides communications services for a user as described herein. However, while data communications and voice communications are modes illustrated herein as being employed to implement the example embodiments, the same modes (e.g., voice) may be employed to activate the enhanced communications. For example, a first voice dialog between the user, via the client device 110, and the data server 120 may occur (in place of the data communications described above) before a subsequent voice dialog the user and interactive response server 130 occurs.

It should be understood that the example embodiments presented herein can be implemented in other arrangements. For example, alternative embodiments can support an upstream device, such as the interactive response server 130, initiating a call with the client device 110 and using the data server 120 in a consistent manner as described above to enable the enhanced communications, where the client device 110 and interactive response server 130 essentially exchange roles, and the procedures presented above occur in reverse.

FIG. 10 illustrates a computer network or similar digital processing environment in which embodiments of the present invention may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 11:
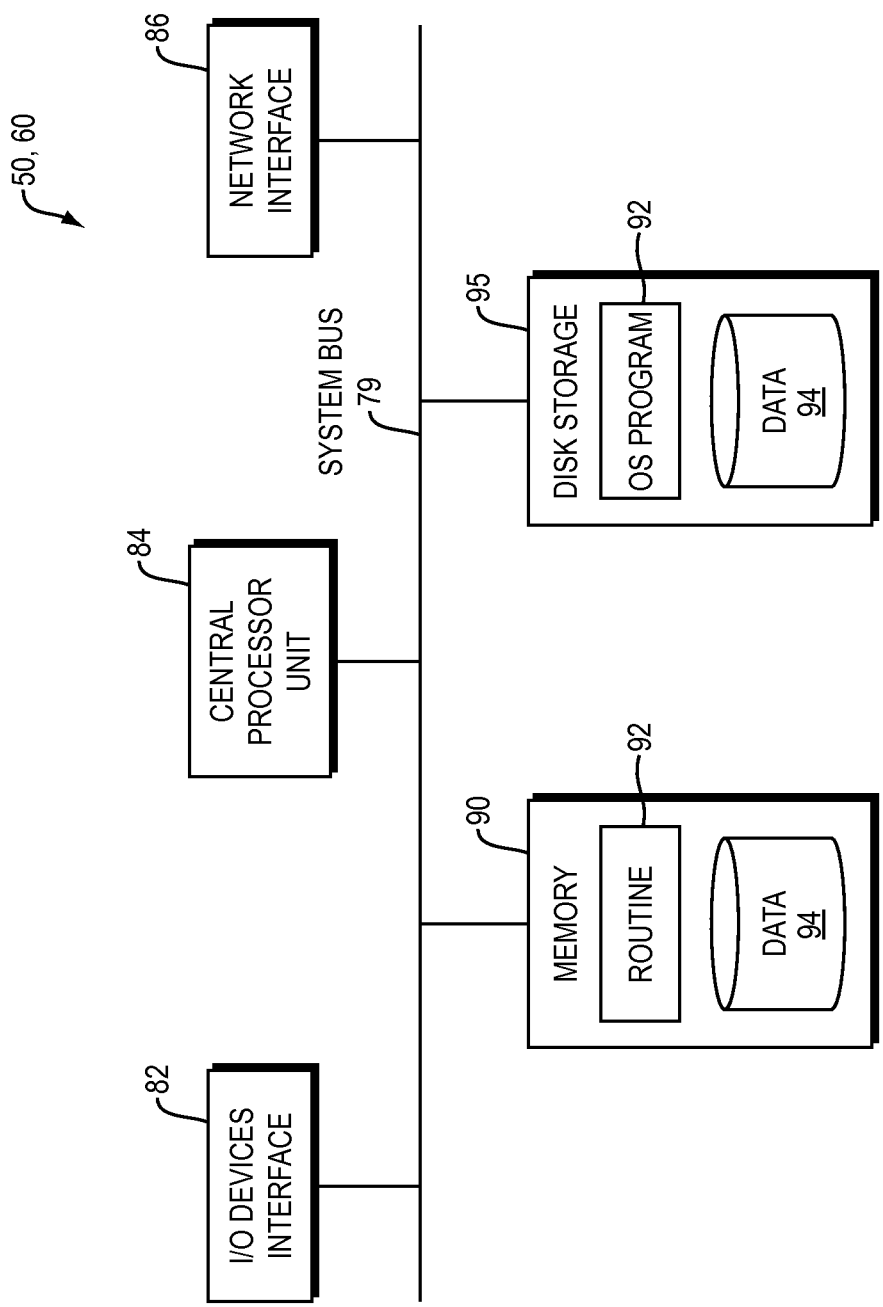
FIG. 11 is a diagram of an example internal structure of a computer (e.g., client processor/device or server computers) in the computer system of FIG. 10.

FIG. 11 is a diagram of an example internal structure of a computer (e.g., client processor/device 50 or server computers 60) in the computer system of FIG. 10. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 9). Memory 90 provides volatile storage for computer software instructions 92 and data 94 used to implement an embodiment of the present invention (e.g., client-side handshake module and communication enhancement module code detailed above). Disk storage 95 provides non-volatile storage for computer software instructions 92 and data 94 used to implement an embodiment of the present invention. A central processor unit 84 is also attached to the system bus 79 and provides for the execution of computer instructions.

In one embodiment, the processor routines 92 and data 94 are a computer program product (generally referenced 92), including a computer-readable medium (e.g., a removable storage medium such as one or more DVD-ROM's, CD-ROM's, diskettes, tapes, etc.) that provides at least a portion of the software instructions for the invention system. The computer program product 92 can be installed by any suitable software installation procedure, as is well known in the art. In another embodiment, at least a portion of the software instructions may also be downloaded over a cable communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternative embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer-readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to example embodiments thereof, it will be understood by those skilled in the art that various changes in form and details may be made therein without departing from the scope of the invention encompassed by the appended claims.

What is claimed is:

1. A method for providing enhanced communications, the method comprising:
by a data server, in response to a call request initiated by a client device:
obtaining, via a data channel, a call request information from the client device before establishing an authenticated voice channel;
obtaining client device information associated with the call request information stored in a database of the data server, wherein the client device information is different than the call request information;
dynamically generating authenticating information;
encrypting the authenticating information with the client device information as an encryption key;
forwarding the encrypted authenticating information to be decrypted by the client device;
forwarding the authenticating information to the interactive voice response server for comparing decrypted authenticating information received by the interactive voice response server from the client device; and
establishing the authenticated voice channel by the interactive voice response server with the client device when the authenticating information matches the decrypted authenticating information.

2. The method of claim 1 further comprising dyanamically Allocating the client device information in the database.

3. An apparatus for providing enhanced communications, the apparatus comprising:
a request module at a data server configured to, responsive to a call request from a client device, obtain, via a data channel, a call request information from the client device before establishing an authenticated voice channel, and further configured to obtain client device information associated with the call request stored in a database of the data server, wherein the client device information is different than the call request information;
a passcode generation module configured to dynamically generate authenticating information;
an encryption module configured to encrypt the authenticating information with the client device information as an encryption key;
a forwarding module configured to forward the encrypted authenticating information to be decrypted by the client device and further configured to forward the authenticating information to an interactive voice response server for comparing decrypted authenticating information received by the interactive voice response server from the client device; and
a voice communications module configured to establish the authenticated voice channel by the interactive voice response server with the client device when the authenticating information matches the decrypted authenticating information.

4. The apparatus of claim 3 wherein the data server is configured to dynamically allocate the client device information in the database.

5. A method for providing enhanced communications, the method comprising:
by an interactive voice response server, responsive to a call request initiated by a client device:
obtaining authenticating information from a data server, the authenticating information dynamically generated by the data server;
obtaining decrypted authenticating information from the client device, the decrypted authenticating information generated by dynamically generated authenticating information being encrypted at the data server with client device information stored at the data server and associated with call request information received at the data server and decrypted at the client device with the client device information, wherein the client device information is different than the call request information;

comparing the decrypted authenticating information to the authenticating information obtained from the data server; and establishing an authenticated voice channel by the interactive voice response server with the client device when the authenticating information matches the decrypted authenticating information.

6. The method of claim 1, wherein the call request information identifies the call by at least one of an automatic number identification (ANI), dialed number identification service (DNIS), and telephone number.

7. The method of claim 1, wherein the client device information is data that identifies at least one component of the client device by at least one of media access control (MAC) address, identifier of hardware of the client device, or a hash of identifiers of the client device.

8. The apparatus of claim 3, wherein the call request information identifies the call by at least one of an automatic number identification (ANI), dialed number identification service (DNIS), and telephone number.

9. The apparatus of claim 3, wherein the client device information is data that identifies at least one component of the client device by at least one of media access control (MAC) address, identifier of hardware of the client device, or a hash of identifiers of the client device.

10. The method of claim 5, wherein the call request information identifies the call by at least one of an automatic number identification (ANI), dialed number identification service (DNIS), and telephone number.

11. The method of claim 5, wherein the client device information is data that identifies at least one component of the client device by at least one of media access control (MAC) address, identifier of hardware of the client device, or a hash of identifiers of the client device.

\* \* \* \* \*